United States Patent
Yonezawa et al.

[11] Patent Number: 5,475,816
[45] Date of Patent: Dec. 12, 1995

[54] REPLY MONITOR FOR A NETWORK OF MICROPROCESSOR-BASED SYSTEMS

[75] Inventors: Naomichi Yonezawa, Tokyo; Yasushi Inoue, Yamanashi, both of Japan

[73] Assignee: NEC Corporation, Tokyo, Japan

[21] Appl. No.: 27,528

[22] Filed: Mar. 8, 1993

[30] Foreign Application Priority Data

Mar. 6, 1992 [JP] Japan ..................................... 4-049055

[51] Int. Cl.⁶ .................................................... G06F 13/14
[52] U.S. Cl. .................. 395/200.06; 395/200.12
[58] Field of Search ...................... 395/800, 325, 395/200, 375, 500, 725, 275, 650, 600; 370/85.1, 85.8, 60, 85.12, 16.3; 340/825.52, 825.06, 825.05, 825, 825.07; 371/32

[56] References Cited

U.S. PATENT DOCUMENTS

| | | | |
|---|---|---|---|
| 4,912,723 | 3/1990 | Verbanets, Jr. .............................. | 375/7 |
| 5,134,691 | 7/1992 | Elms ....................................... | 395/200 |

*Primary Examiner*—Alyssa H. Bowler
*Assistant Examiner*—Charles Kyle
*Attorney, Agent, or Firm*—Foley & Lardner

[57] ABSTRACT

In a computer network, at least one of the computers transmits a request packet to a destination urge a reply packet therefrom. A decoder is provided to determine the identity of a destination from which a reply packet is received and, in response, generates a reply interrupt command. A microprocessor is responsive to the reply interrupt command for performing a reply interrupt routine. First and second reply monitor circuits are associated respectively with other computers. Each of the reply monitor circuits comprises a flag arranged to be set when a request packet is transmitted from the microprocessor to another computer with which the reply monitor circuit is associated and arranged to be reset by the decoder when a reply packet is received from the another microprocessor-based system. A timer is activated in response to the flag being set for measuring the amount of time and deactivated in response to the flag being reset. The timer applies a time-out interrupt command to the microprocessor when a predetermined amount of time has elapsed to cause it to perform a time-out interrupt routine.

1 Claim, 2 Drawing Sheets

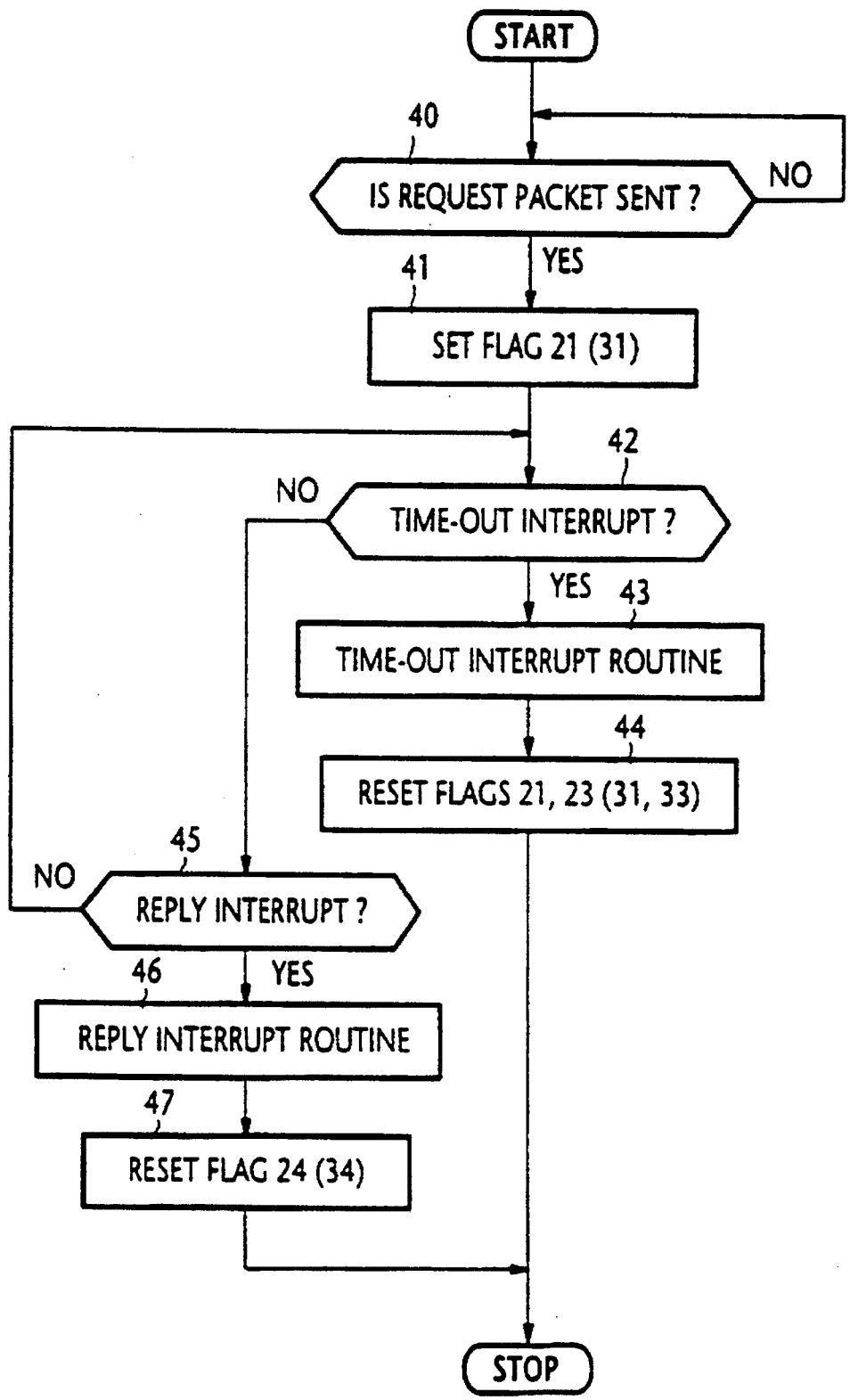

5,475,816

REPLY MONITOR FOR A NETWORK OF MICROPROCESSOR-BASED SYSTEMS

BACKGROUND OF THE INVENTION

1. Field of the Invention

The present invention relates to a network of microprocessor-based systems for monitoring a reply packet that is returned in response to a request packet.

2. Description of the Related Art

In current communication networks where microprocessor-based systems are interconnected by a common communication channel, each communication source monitors the communication channel to receive a reply packet from the destination after transmission of a request packet. This monitoring function is implemented with firmware or software. If it takes a long time for the respondent system to return a reply, the requesting system must simply wait for the reply and is therefore prevented from doing other jobs. Alternatively, a reply flag is currently employed to indicate the receipt of a reply to invoke a reply interrupt routine. While this approach eliminates the need to monitor the reply packet, the failure on the part of the respondent to return a reply cannot be recognized by the source system.

SUMMARY OF THE INVENTION

It is therefore an object of the present invention to provide a microprocessor-based system that is constrained in as short a period of time as possible by waiting for a reply packet after transmission of a request packet.

According to a broader aspect, the present invention provides a network of microprocessor-based systems interconnected by a communication channel. At least one of the systems comprises a flag and a timer arranged to be activated in response to the flag being set for measuring the amount of time and deactivated in response to the flag being reset. The timer generates a time-out interrupt command when a predetermined amount of time has elapsed. A microprocessor is responsive to transmission of a request packet onto the communication channel for setting the flag and responsive to the time-out interrupt command to perform a time-out interrupt routine. When a reply packet is received from the communication channel the flag is reset and a reply interrupt command applied to the microprocessor to perform a reply interrupt routine.

According to a specific aspect of the present invention, there is provided a network of microprocessor-based systems interconnected by a communication channel, wherein at least one of the systems comprises a decoder for receiving a reply packet through the communication channel and determining the identity of the microprocessor-based system which transmitted the reply packet. The decoder generates a reply interrupt command when a reply packet is received from the communication channel. A microprocessor is responsive to the reply interrupt command for performing a reply interrupt routine. First and second reply monitor circuits are associated respectively with other microprocessor-based systems. Each of the first and second reply monitor circuits comprises a flag arranged to be set when a request packet is sent from the microprocessor to another microprocessor-based system with which the reply monitor circuit is associated and arranged to be reset by the decoder when a reply packet is received from that microprocessor-based system. A timer is arranged to be activated in response to the flag being set for measuring the amount of time and deactivated in response to the flag being reset. The timer applies a time-out interrupt command to the microprocessor when a predetermined amount of time has elapsed to cause it to perform a time-out interrupt routine.

BRIEF DESCRIPTION OF THE DRAWINGS

The present invention will be described in further detail with reference to the accompanying drawings, in which:

FIG. 2 is a flowchart describing a sequence of instructions performed by the microprocessor of FIG. 1.

DETAILED DESCRIPTION

Figure 1:
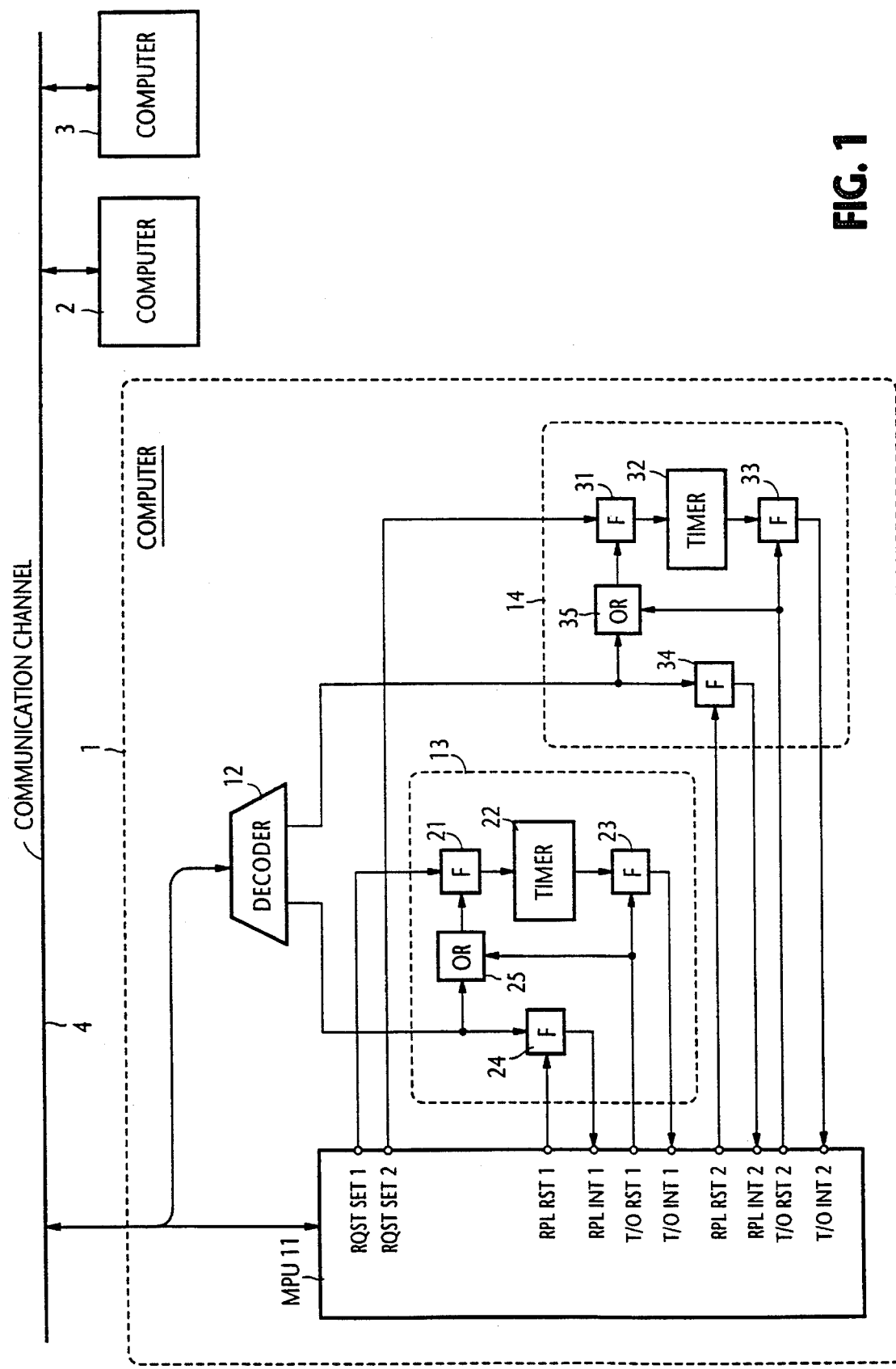
FIG. 1 is a block diagram of a network of microprocessor-based systems embodying the present invention.

Referring now to FIG. 1, there is shown a network of computers or microprocessor-based systems to provide communication according to an embodiment of the present invention. The computer network is comprised of a number of computers 1, 2 and 3 connected by a communication channel 4. As a representative of the computers, computer 1 comprises a microprocessor unit (MPU) 11 from which a request packet requiring a response is transmitted onto the communication channel 4 to computer 2 or 3 or both. A decoder 12 is also connected to the communication channel to examine the source address transmitted with a reply packet from the communication channel and applies the reply packet to one of first and second identical reply monitor circuits 13 and 14 which are associated respectively with computers 2 and 3.

Reply monitor circuit 13 includes a request-sent flag 21 having a set input connected to a request set port RQST SET 1 of MPU 11 and a reset input connected to the output of an OR gate 25, a timer 22 connected to the output of the flag 21, a time-out flag 23 having a set input connected to the output of timer 22 and a reset input connected to a time-out reset port T/O RST 1, and a reply flag 24 having a set input connected to the first output terminal of decoder 12 and a reset input connected to reply reset port RPL RST 1 of MPU 11. In like manner, reply monitor circuit 14 includes a request-sent flag 31 having a set input connected to a request set port RQST SET 2 of MPU 11 and a reset input connected to the output of an OR gate 35, a timer 32 connected to the output of flag 31, a time-out flag 33 having a set input connected to the output of timer 32 and a reset input connected to a time-out reset port T/O RST 2, and a reply flag 34 having a set input connected to the second output terminal of decoder 12 and a reset input connected to reply reset port RPL RST 2 of MPU 11.

A binary 1 is set in request-sent flag 21 by MPU 11 through a port RQST SET 1 when the computer 1 transmits a request packet to computer 2 and, in response, the timer 22 is activated. If a reply packet is not received from computer 2 within a predetermined time-out period, timer 22 sets a binary 1 in flag 23 to notify this fact to MPU 11 via a time-out interrupt port T/O INT 1. The output of flag 23 is applied to MPU 11 via a time-out interrupt port T/O INT 1 as a timeout interrupt command to indicate that the computer 2 has failed to respond to the request packet. On receiving this indication, MPU 11 resets flag 23 via a time-out reset port T/O RST 1 and flag 21 through an OR gate 25.

If a reply packet is received from computer 2 within the time-out period, decoder 12 sets flag 24 to binary 1 and resets flag 21 to binary 0 through OR gate 25 to deactivate the timer 22. The output of flag 24 is applied to MPU 11 via a reply interrupt port RPL INT 1 as a reply interrupt command.

In more detail, MPU 11 executes instructions of FIG. 2 during a communication mode. Program execution starts with block 40 to check to see if a request packet is sent to computer 2 or 3. If the answer is affirmative, control branches at block 40 to block 41 to set flag 21 or 31. If the request packet is sent to computer 2, flag 21 is set to binary 1 and if it is sent to computer 3 flag 31 is set. Exit then is to block 42 to check to see if a time-out interrupt is generated by flag 23 or 33. If the answer is affirmative, control branches at block 42 to block 43 to perform a time-out interrupt routine, and exits then to block 44 to reset flags 21, 23 (31, 33). If the answer is negative in block 42, control branches to block 45 to check to see if a reply interrupt is generated by flag 24 (34). If not, control returns to block 42 to repeat the process. If a reply interrupt is generated, control branches to block 46 to execute a reply interrupt routine, and then exits to block 47 to rest flag 24 (34), Assume that computer 1 initially transmitted a request packet to computer 2, MPU 11 sets flag 21 (blocks 40, 41), causing timer 22 to start measuring the lapse of time. If computer 1 subsequently transmitted a request to computer 3, MPU 11 sets flag 31, causing timer 32 to start measuring the lapse of time. If a reply packet is returned from computer 3 within the period of timer 32, it is passed through decoder 12 to monitor circuit 14 where it resets flag 31 to stop the timer 32 and sets flag 34 (blocks 42, 45), so that MPU 11 is notified of the receipt of a reply from computer 3 to invoke a reply interrupt routine by taking an appropriate action (block 46), and resets flag 34 (block 47).

If a trouble has occurred in computer 2 and no reply is returned as a result within the period of timer 22, flag 23 is set by the timer 22, applying a time-out interrupt to MPU 11 (block 42), causing it to invoke a time-out interrupt routine (block 43)in order to issue a trouble report, for example, and reset flags 21, 23 (block 44).

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A network of microprocessor-based systems interconnected by a communication channel, wherein at least one of said system comprises:

decoder means for receiving a reply packet through said communication channel and determining the identity of the microprocessor-based system which transmitted the reply packet and generating a reply interrupt command when a reply packet is received;

first and second reply monitor circuits associated respectively with first and second microprocessor-based systems, each of the first and second reply monitor circuits being connected to said decoder means for receiving said reply interrupt command therefrom, each of said first and second reply monitor circuits comprising:

first, second and third flags, said first flag being reset and said third flag being set when a reply packet is received from the corresponding microprocessor-based system via the decoder means;

a timer arranged to be activated in response to said first flag being set for measuring an amount of time, said timer being deactivated in response to said first flag being reset, said timer setting said second flag when a predetermined amount of time elapses from when said timer is activated if said timer is not deactivated during said predetermined amount of time; and a microprocessor responsive to transmission of a request packet onto the communication channel for setting said first flag, the microprocessor having a first interrupt port responsive to the setting of said second flag for performing a time-out interrupt routine and a second interrupt port responsive to the setting of said third flag for performing a reply interrupt routine, said microprocessor resetting the second and third flags when the time-out interrupt routine and the reply interrupt routine are respectively performed.

* * * * *